United States Patent [19]
Yanagimoto

[11] Patent Number: 5,805,092
[45] Date of Patent: Sep. 8, 1998

[54] APPARATUS FOR MEASURING A MEMORY DEVICE

[75] Inventor: Yoshiyuki Yanagimoto, Hyogo, Japan

[73] Assignee: Hewlett-Packard Company, Palo Alto, Calif.

[21] Appl. No.: 806,897

[22] Filed: Feb. 25, 1997

[30] Foreign Application Priority Data

Feb. 27, 1996  [JP]  Japan .................................. 8-040130

[51] Int. Cl.⁶ .................................................. H03M 1/00
[52] U.S. Cl. ............................................ 341/123; 348/537
[58] Field of Search .................................. 341/155, 122, 341/123, 124, 125; 375/372; 348/537

[56] References Cited

U.S. PATENT DOCUMENTS

| 4,905,085 | 2/1990 | Faulhaber ................................ 348/537 |
| 5,572,556 | 11/1996 | Satoh ..................................... 375/372 |

OTHER PUBLICATIONS

Timing Recovery in Digital Synchronous Data Receivers – IEEE Trans. Comm. May 1976, No. 5, pp. 516–530.
Timing Recovery in Synchronous Equalized Data Communications –IEEE Trans. Comm. Feb. 1975, No. 2, pp. 269–274.
Timing Recovery for Equalized Partial Response Systems – IEEE Trans. Comm. Dec. 1976, No. 12, pp. 1326–1331.

*Primary Examiner*—Brian K. Young

[57] ABSTRACT

In apparatus that measures the characteristics of the read-out signals from memory media, in the prior art, phase control of the clock signals for synchronized sampling of the measurement apparatus was performed by using the read-out signals. Synchronization discrepancies and inability to perform synchronization were produced due to the quality of the read-out signals. In the invention, a Logical processing part generates selection signals that control the selection of samples with phase information, for performing synchronization, from test signals of a recording part, which records the same signal train as the test signal train written onto the memory medium. By the control of these selection signals, samples with phase information for performing synchronization are selected from the sample train output from an A/D converter through an equalizer; these samples pass through a selection part and a control clock generating part by means of the processing of a feed-back processing part. The samples with phase information are fed back, and correct phase control is performed.

9 Claims, 17 Drawing Sheets

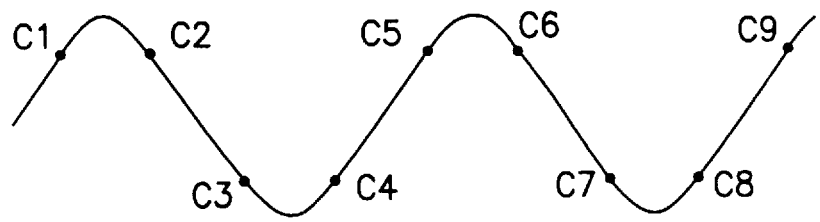
FIG.4
| | C1 | C2 | C3 | C4 | C5 | C6 | C7 | C8 | C9 |
|---|---|---|---|---|---|---|---|---|---|
| D+ | 0 | 1 | 1 | 0 | 0 | 1 | 1 | 0 | 0 |
| D− | 1 | 0 | 0 | 1 | 1 | 0 | 0 | 1 | 1 |
FIG.5
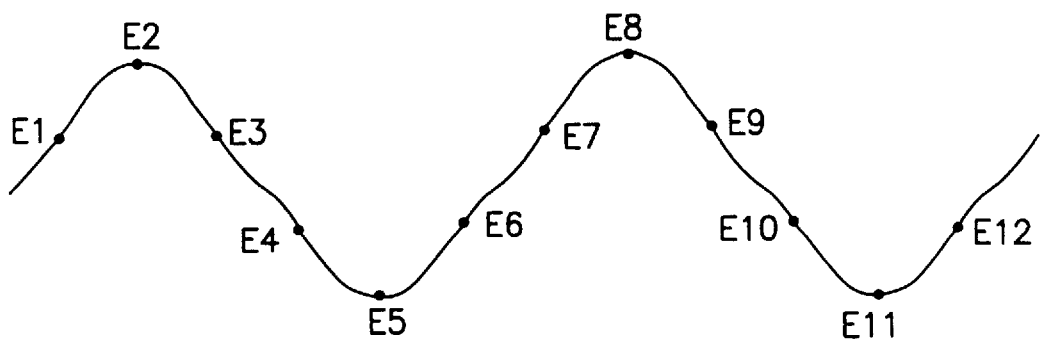
FIG.6

|    | E1 | E2 | E3 | E4 | E5 | E6 | E7 | E8 | E9 | E10 | E11 | E12 |
|----|----|----|----|----|----|----|----|----|----|-----|-----|-----|
| F+ | 0  | 0  | 1  | 1  | 0  | 0  | 0  | 0  | 1  | 1   | 0   | 0   |
| F− | 1  | 0  | 0  | 0  | 0  | 1  | 1  | 0  | 0  | 0   | 0   | 1   |

|    | G1 | G2 | G3 | G4 | G5 | G6 | G7 | G8 | G9 | G10 | G11 | G12 |
|----|----|----|----|----|----|----|----|----|----|-----|-----|-----|
| H+ | 0  | 0  | 1  | 1  | 0  | 0  | 0  | 0  | 1  | 0   | 1   | 0   |
| H− | 0  | 1  | 0  | 0  | 1  | 0  | 0  | 1  | 0  | 0   | 0   | 1   |

|    | A1 | A2 | A3 | A4 | A5 | A6 | A7 | A8 |
|----|----|----|----|----|----|----|----|----|
| B+ | 0  | 0  | 1  | 0  | 0  | 1  | 0  | 0  |
| B− | 0  | 1  | 0  | 0  | 0  | 0  | 1  | 0  |

FIG.11

|    | A1 | A2 | A3 | A4 | A5 | A6 | A7 | A8 |
|----|----|----|----|----|----|----|----|----|
| B+ | 0  | 0  | 0  | 0  | 0  | 1  | 0  | 0  |
| B− | 0  | 1  | 0  | 0  | 0  | 0  | 0  | 0  |

FIG.12

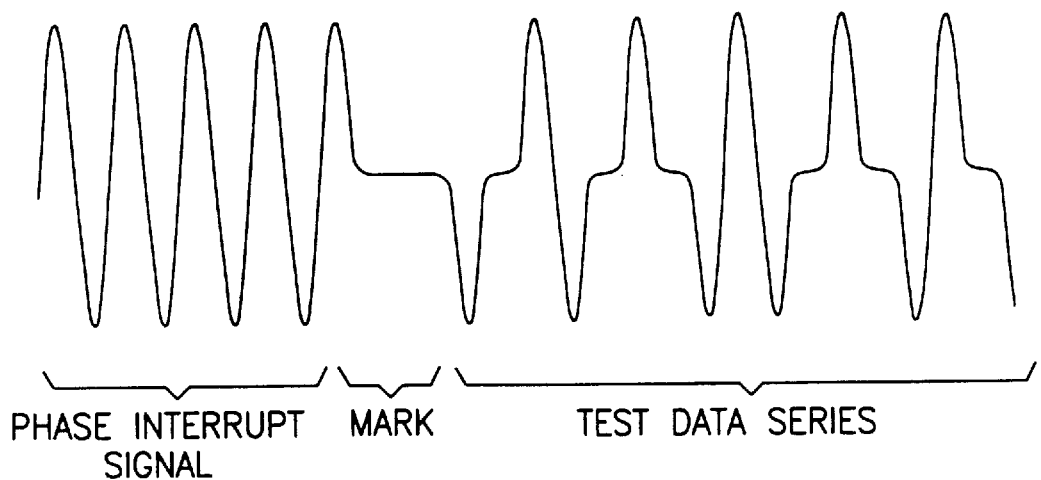
PHASE INTERRUPT SIGNAL | MARK | TEST DATA SERIES
FIG.15
| 0 | 0 | 1 | 1 | 1 | 1 | 0 | 0 |
FIG.18
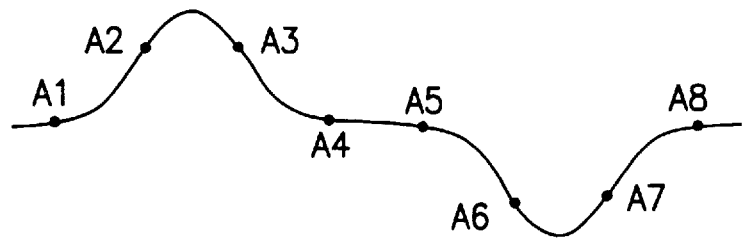
FIG.19

WHEN An > 0 :         An−An−1 > k
                  An + 1 − An = PHASE INFORMATION

K2 < A2       A4 < K1
A4 − A2 = PHASE INFORMATION

RIGHT    0    0    1    1    1
WRONG   0    0    0    1    1

APPARATUS FOR MEASURING A MEMORY DEVICE

FIELD OF THE INVENTION

This invention concerns a device that measures the characteristics of signals read out from digital memory media, such as magnetic disks, optical disks, magnetic tape, etc.

BACKGROUND OF THE INVENTION

Signals read out from a digital memory medium do not match the ideal read-out waveform, due to the characteristics of the memory medium, the writing head and the reading head, as well as the read write electrical circuits. Therefore, bit errors occur. The causes for the fact that the signals do not match the ideal waveform are, for example, intersymbol interference due to adjacent bits, frequency characteristics, noise, distortion, etc.

The operating conditions required of memory devices tend to become more and more rigorous, due to the demand for increased bit density. In order to obtain reliable operation under such rigorous conditions, a method is used, in which synchronous sampling is used and signal processing, typified by partial-response maximum-likelihood (abbreviated below as "PRML"), is used in the subsequent stages.

In order to evaluate the properties of the heads, media, or electrical circuits used in memory devices that use PRML, the quality of the read-out signals from the memory means is evaluated. In order to evaluate the characteristics of the read-out signals, in addition to the conventional measurements (pulse width, amplitude, carrier/noise ratio), the necessity has arisen of measuring characteristics such as amplitude margin, non-linear magnetization transfer point shift (abbreviated below as "NLTS"), signal/noise ratio by an auto-correlation method, etc. This invention concerns a device for measuring these characteristics.

In order to measure the characteristics of read-out signals from a memory device, an oscilloscope is frequently used. The desired characteristic coefficients can be obtained by calculation from waveforms received by the oscilloscope. However, the sampling of waveforms by the oscilloscope is not synchronized with the read-out signals. Therefore, in measurements using the values of the samples of the synchronization points, such as the amplitude margin, NLTS, and S/N ratio, it is necessary to perform calculations in order to obtain synchronously sampled values out of the asynchronously captured waveform. Time is required for these calculations. Moreover, the sampling period of the oscilloscope must be shorter than the sampling period of the read-out signals, and this has also placed burdens on the oscilloscope hardware.

In order to solve these problems, devices have been made in the prior art that perform synchronous sampling. If synchronous sampling is performed, two advantages are obtained: the advantage of being able to eliminate the time-consuming operation of interpolating the signals that have been sampled asynchronously, as described above, and obtaining the sample values of the synchronization points by calculation, and the advantage of simplifying the hardware by keeping the number of sampling points to the minimum required.

The method used for performing the synchronous sampling in the apparatus for measuring a memory device is the same method as the synchronous extraction method that is used in memory devices such as hard disks, optical disks, etc. This synchronous extraction method presupposes that the content of the read-out signals from the memory medium is not known. External memory devices, typified by disk drives, have the purpose of preserving data that outstrips the storage capacity of the semiconductor memory within a computer. There is no information on the data contained in the read out signal from the disk drive other than in the memory device itself. Therefore, the synchronous extraction method, as shown by examples below, is used. The same method is also used in the apparatus for measuring a memory device.

In FIG. 18, the states of the magnetization of the memory means in which the data are written are shown by 1 or 0. Each 1 or 0 in FIG. 18 corresponds to a channel bit of the NRZI format. One channel bit corresponds to one clock cycle in the writing process.

FIG. 19 shows an example of read-out signals corresponding to PR4 partial response. With PR4, one magnetic flux change generates an output of (1,1). That is, as shown by the solid curve of FIG. 19, in the magnetic flux change from 0 to 1, the upwardly convex output (1,1) occurs, and in the magnetization reversal from 1 to 0, the downwardly convex output (−1,−1) occurs. If a sampling synchronized with this read-out signal is performed, the sampling points shown by the dots A1 to A8 in FIG. 19 result. In the case of the ideal read-out signals and sampling, A1=A4=A5=A8=0, A2=A3=1, and A6=A7=−1. Among A1 to A8, the samples that have the phase information for synchronization are A2, A3, A6, and A7. Moreover, if the sampling is synchronized, A3−A2=0 and A6−A7=0.

FIGS. 20 and 21 show examples of sampling that are not synchronized. FIG. 20 is an example in which the phase of the sampling is retarded. At this time, the value of A3−A2 becomes negative. FIG. 21 is an example in which the phase of the sampling is advanced. At this time, the value of A3−A2 becomes positive. When the sampling is synchronized, as mentioned above, A3−A2=0. Therefore, since A3−A2 has the information of the magnitude and polarity of the phase difference, A3−A2 will hereafter be called the "phase information", and A3 and A2 will be called "samples with phase information."

With reference to A6 and A7, in the same manner, A6−A7 is the phase information. If the phase information obtained in this manner is fed back to the phase feed-back circuit, which controls the clock of the sampling signals, synchronized sampling can be realized.

FIG. 22 shows an example of EPR4. In the case of EPR4, the A4−A2 and A6−A8 of FIG. 22 become the phase information. FIGS. 23, 24, and 25 show examples of PR (1,1). FIG. 23 is the case of ideal read-out signals and sampling; A1=A7=A8=0, A2=A6=1, and A3=A4=A5=2. FIGS. 24 and 25 are examples of unsynchronized sampling, in the same manner as in FIGS. 20 and 21. From what has been said above, the fact that A6−A2 is the phase information can be explained in the same manner as in the case of PR4. In the case of PR (1,1), 1−A2 can be another representative of the phase information.

If the samples with phase information can be identified, a method for obtaining phase information is established, as described above. The problem is how to judge which samples among the samples obtained for every clock time have the phase information. Before discussing the method of judgment of the prior art, the arrangement of the prior art will be discussed.

FIG. 26 shows the basic arrangement of the synchronous sampling of the prior art. The read-out signal 10 from the memory medium is applied to an A/D converter 11. The A/D converter 11 samples the read-out signal 10 from the memory medium according to the clock signal from the clock generating part 15, i.e., the sampling signal. The output of the A/D converter 11 is often equalized by equalizer 12.

The measurement of the characteristic coefficients of the read-out signal is performed by signal-processing the output of A/D converter 11 or the output of equalizer 12. In FIG. 26, however, this signal processing part is omitted.

The output of equalizer 12 is applied to the logical processing part 17 and selection part 13. Logical processing part 17 discriminates the samples with phase information (in the case of PR4, A2, A3, A6, and A7) from the sample train by logical processing. When the samples with phase information have been discriminated, selection means 13 sends the output of equalizer 12, i.e., the values of the samples, to feed-back processing part 14. Feed-back processing part 14 transforms these sample values into signals controlling clock generating part 15 (in the case of PR4, analog signals corresponding to A3–A2 and A6–A7), and controls the frequency of clock of the clock generating part 15. The clock generating part 15 is ordinarily constructed by a voltage-controlled oscillator. In this manner, A/D converting part 11, equalizer 12, selection part 13, feed-back processing part 14, and clock generating part 15 form a phase feed-back circuit, and sampling that is synchronized to the read-out signal is performed by feed-back control.

In FIG. 26, logical processing part 17 performs a method in respect of a memory device, such as a hard disk, wherein the values sampled successively are successively judged and selected. Various methods have been devised for performing this judgment, but they may be generally classified into two types.

The first method is one in which, when a series of sample values satisfy certain conditions, they are taken as samples with phase information. FIG. 27 shows one example of this method. If the difference between the current sample A2 and the previous sample A1 is above a certain value k (e.g., 0.6, etc.) (A2−A1>k), the difference A3−A2 between the present sample A2 and the next sample A3 is taken as the phase information.

FIG. 28 is an example of EPR4; in this method, the samples with phase information are selected by using as a condition, the fact that two samples that are one sample apart (in this case, A2 and A4) are within a certain desired range (e.g., from 0.6 to 1.4). In this case, A4−A2 becomes the phase information.

In the second method, a decoder is used as the logical processing part 17. An example of this method is shown in FIG. 29. Decoder 19 decodes the channel bits out of the sampled values and the decoded channel bits are used for selecting the samples with phase information by selection part 13. If the decoded channel bits show a transition from 0 to 1, then the corresponding sampled values A2 and A3 are presumed to be the samples with phase information.

The prior art described above is a technology that is used in the memory device itself; the same kind of technology is also used in the measurement apparatus for evaluating memory devices.

Problems That This Invention Seeks to Solve

Since the measurement apparatus evaluates memory devices, it is necessary for it to be able to make correct measurements on signals even under more rigorous conditions than the memory devices. For example, in the selection method of the prior art, shown in FIG. 27, one considers the case in which the phase of the sampling is advanced and noise has been superimposed on it, as in FIG. 30. Because of the noise added at the point A2, the value that should have been A2 originally has become A2'; in this case, the condition A2'−A1>k is not satisfied, but the condition A3−A2'>k can be satisfied. In such a case, in the prior art, A4−A3 is output as the phase information.

FIG. 30 is an example of the case in which the sampling phase is advanced. Since A4−A3 is a negative value which means that the phase is delayed, the correct phase feed-back does not operate.

If the noise that is added to the samples A2 and A3 is low enough (because of the fact that noise can be reduced by averaging), the phase error due to the noise is also averaged out by the integrating effect of the phase feed-back circuit. Therefore, it does not have a large effect on the measurement. However, in cases in which wrong samples (in this case, A4 and A3) are selected and the phase information A4−A3 is output, the noise cannot be averaged out and causes a large phase error, which causes a measurement error.

In the case of using a decoder, also, the decoded value contains errors, due to the effect of noise, etc., as indicated in FIG. 31. Wrong samples are selected by selection signals given from erroneously decoded signals. In the case of FIG. 31, the samples with phase information are judged wrongly to be A4 and A3. Therefore, the output of feed-back processing part 14 is also erroneous, and a correct phase feed-back does not operate. The erroneous phase feed-back leads to an erroneous operation of the phase feed-back circuit, and this causes bit slip, etc. Even if we do not assume that the result becomes as severe as a bit slip, the read-out signal is not sampled at timing that was originally supposed to be used. Therefore, it cannot be said that the measurement was correctly conducted.

It is not permissible that the quality of the measurements by a measurement apparatus depend on the quality of the read out signal that is being measured. However, in prior art measurement apparatus, as discussed above, the quality of the read-out signal affects the quality of the synchronous sampling of the measurement apparatus. Therefore, errors are contained in the measurement values, even if the result is not so poor that measurement becomes impossible.

SUMMARY OF THE INVENTION

In the prior art, samples with phase information were selected using the information from the read-out signal from the memory device. In this invention, the measurement apparatus is provided with a test signal recording means that stores the same signals as the test signals that were written onto the memory device; the logical processing part logically processes the signals of this test signal recording part and generates a selection signal train that selects the samples with phase information. Since the signals written onto the memory device correspond one-to-one with the signals of the test signal recording part, the samples that have phase information in the sample train (made by sampling the read-out signals) can be accurately judged.

In the prior art, the arrangement was such that it was easily affected by noise, etc., included in the read-out signals from the memory device. This invention can discriminate the samples with phase information without making mistakes, even with read-out signals that have been greatly affected by noise, etc. As a result, correct phase information is obtained, and stability of the phase feed-back circuit is achieved. Therefore, correct measurement can be performed.

BRIEF DESCRIPTION OF THE DRAWINGS

FIG. 4: Drawing showing an example of the test signals, read-out signals, and sampling points of a PR4 signal.

FIG. 5: Drawing showing a selection signal train that selects the samples of a PR4 signal.

FIG. 6 Drawing showing an example of the read-out signal, and sampling points of an EPR4 signal.

FIG. 11: Drawing showing a selection signal train that selects the samples of a PR4 read-out signal.

FIG. 12: Drawing showing a selection signal train that selects the samples of a PR (1,1) read-out signal.

FIG. 15: Drawing showing an example of the test signals of the sixth embodiment of this invention.

FIG. 18: Drawing showing an example of the recorded state of the memory medium.

FIG. 19: Drawing showing an example of read-out signals corresponding to the PR4 mode.

Explanation of Symbols

Figure 1:
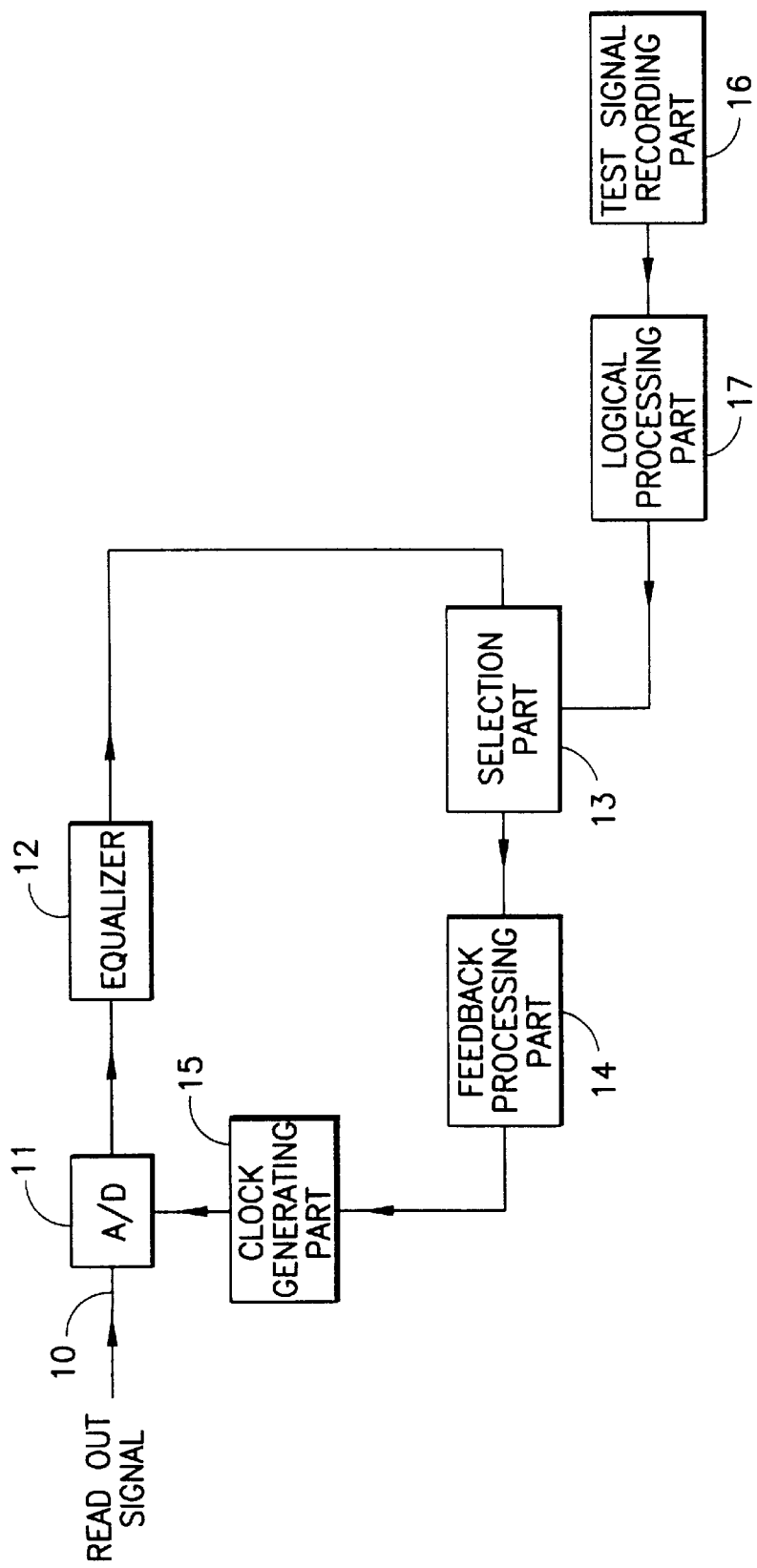
FIG. 1: Drawing showing a first embodiment of this invention.

10: Read-out signal
11: A/D converter
12: Equalizer
13: Selection part
14: Feed-back processing part
15: Clock generating part
16: Test signal recording part
17: Logical processing part
18: Analog equalizer
19: Decoder
20: Divide-by-N counter
21: Switch
22: Switch
23: D/A converter
24: D/A converter
25: Differential amplifier
26: Integrator
27: latch
28: Latch
29: First logical processing part
30: Second logical processing part
31: Third logical processing part
32: Fourth logical processing part
33: Detector
34: Switch
35: Switch
36: Switch
37: Logical subtractor
38: Logical processing circuit

DETAILED DESCRIPTION OF THE INVENTION

Figure 26:
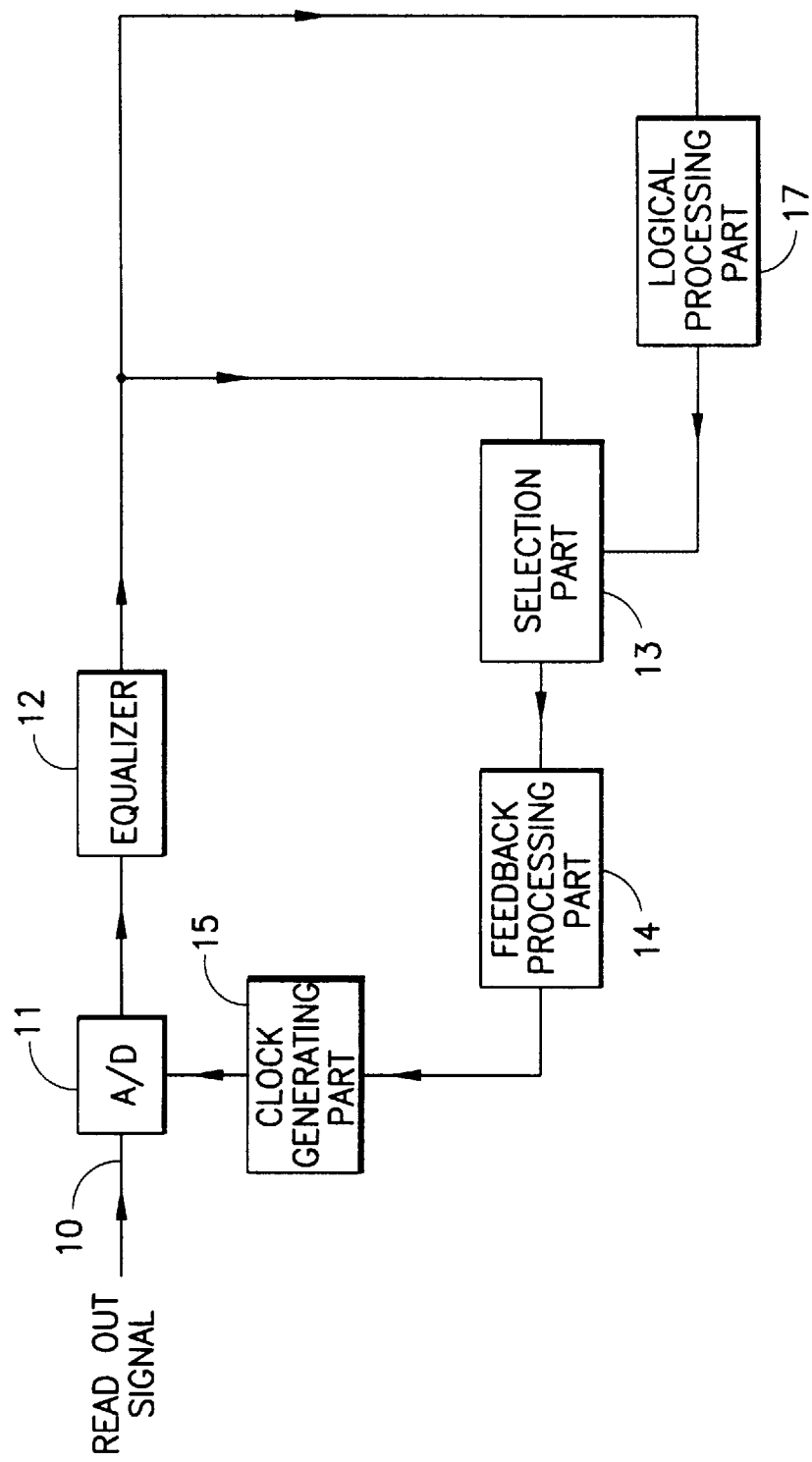
FIG. 26: Drawing showing a first example of the prior art.
Figure 27:
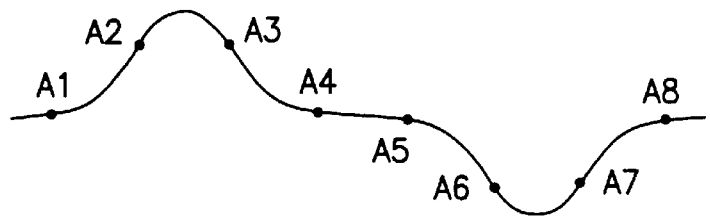
FIG. 27 Drawing showing a method of selecting samples with phase information.
Figure 28:
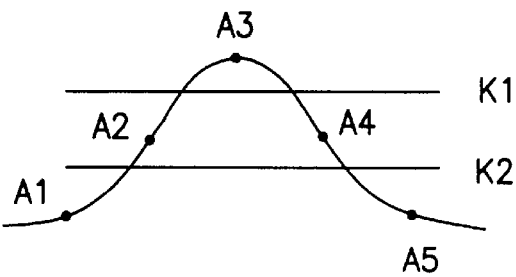
FIG. 28 Drawing showing a method of selecting samples with phase information.
Figure 30:
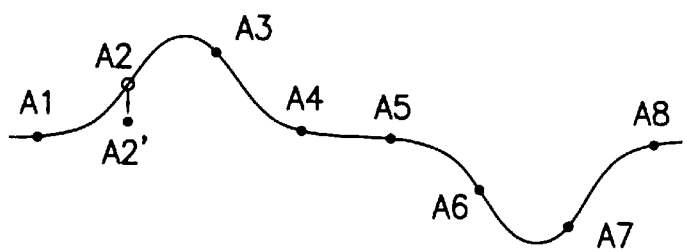
FIG. 30: Drawing showing an example of noise superimposed on a sample point.
Figure 31:
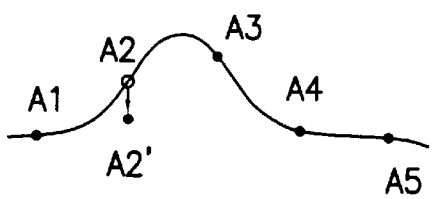
FIG. 31: Drawing showing an example of noise superimposed on a sample point.
Figure 29:
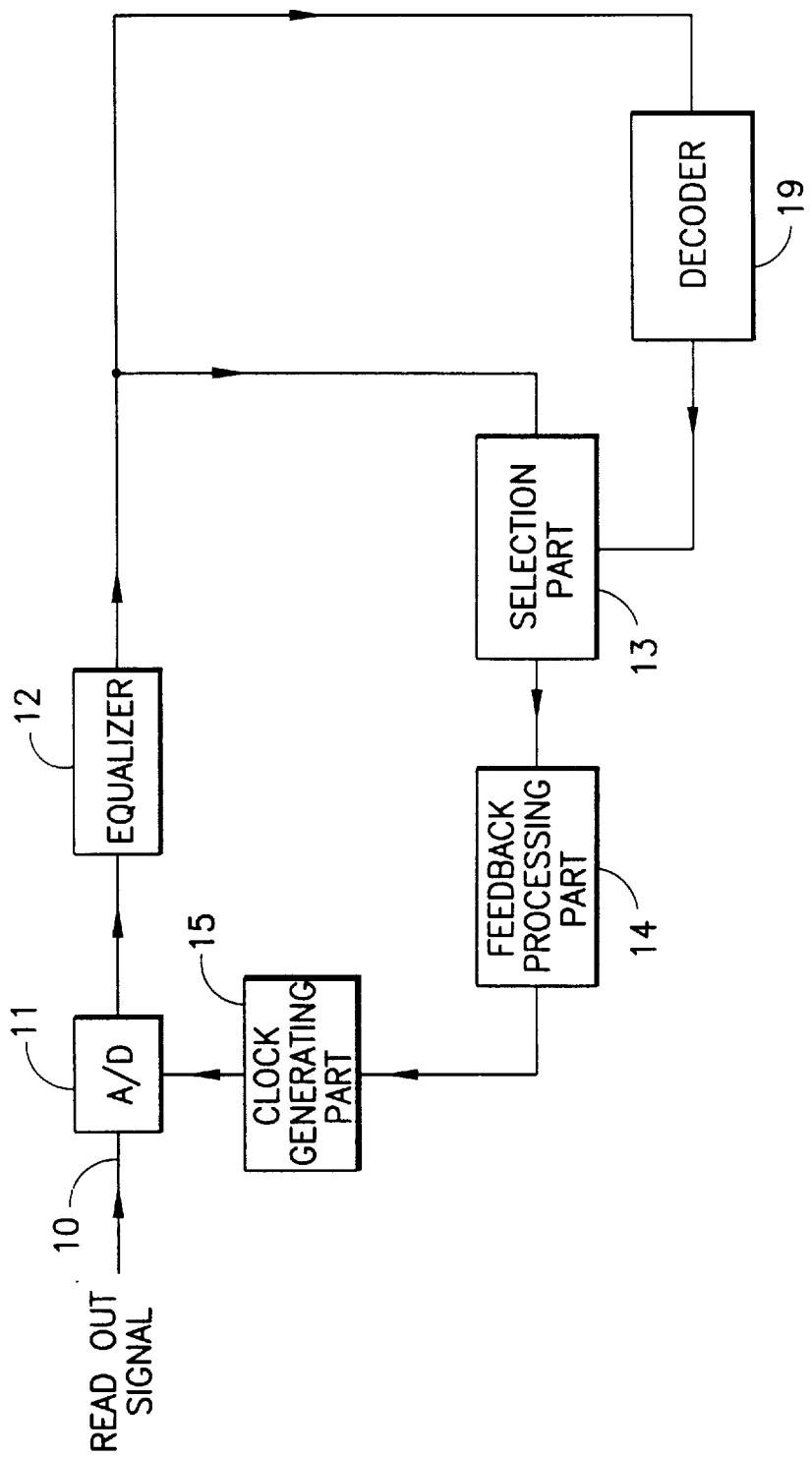
FIG. 29: Drawing showing a second example of the prior art.

FIG. 1 is a drawing that shows a first embodiment of this invention. In FIG. 1, the constituent elements that have the same functions as in the prior art, as shown in FIG. 26, are given the same reference numbers. In FIG. 1, the test signal recording part 16 stores the same signals as the test signals that were written onto the memory device. The logical processing part 17 discriminates the signals with phase information by logically processing the signals of test signal recording part 16, and generates a selection signal train that selects the samples.

Figure 2:
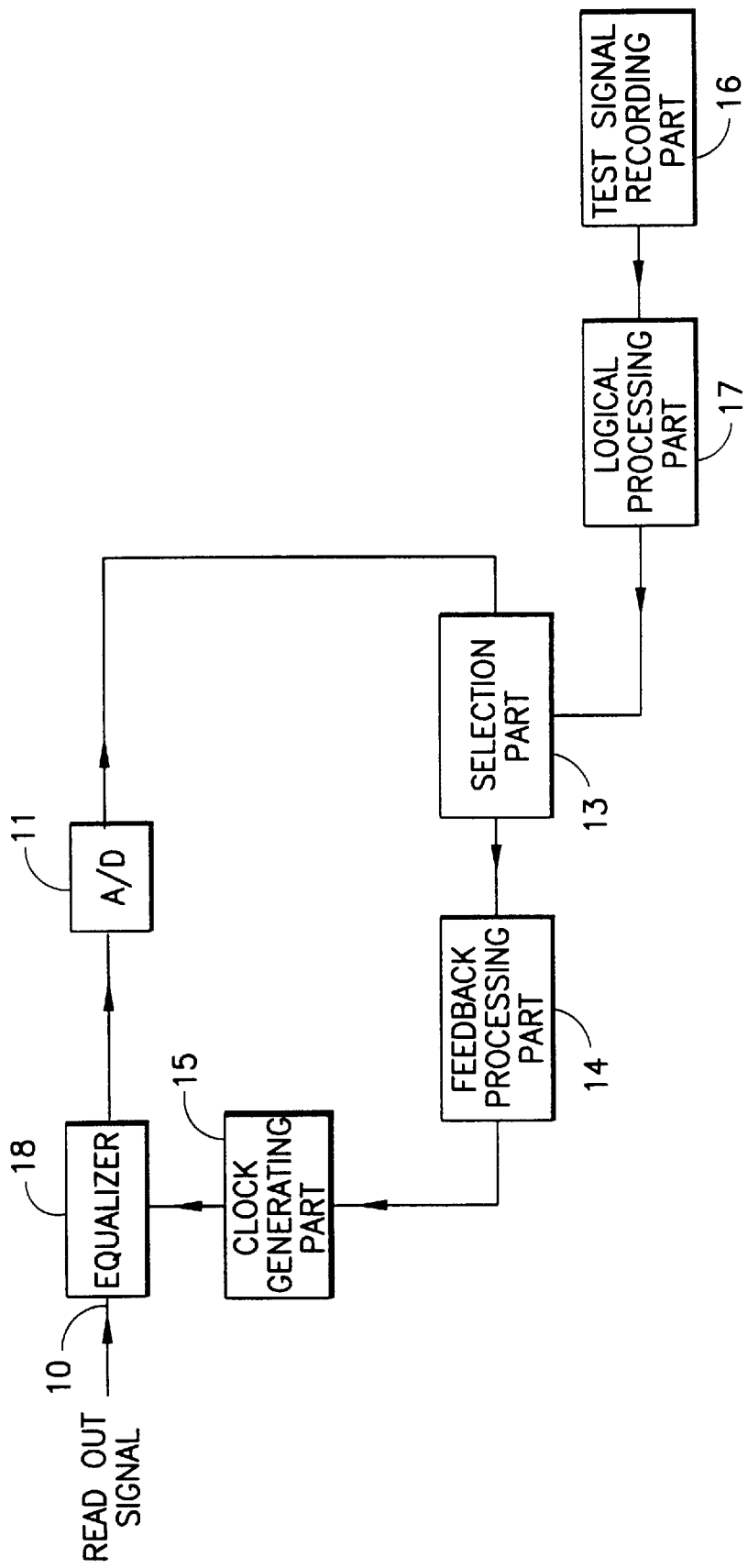
FIG. 2: Drawing showing a second embodiment of this invention.

FIG. 2 is a drawing that shows the second embodiment of this invention. The arrangement of FIG. 2 has an equalizer that is placed in the stage before A/D convertor 11. This equalizer 18 is an analog equalizer. Except for this point, FIG. 2 is the same as the example of FIG. 1, and the example of FIG. 1 will be discussed below.

In FIG. 1, A/D converter 11 samples read-out signals 10 from the memory medium and converts them to a sample train. This sample train is equalized by equalizer 12 and applied to selection part 13. Logical processing part 17 logically processes the test signals that are read out from test signal recording part 16, taking into account the fact that there is an equalizer between the A/D and selection part 13.

In order to simplify the explanation, the case in which no equalization processing is performed, will be discussed below. Since the presence or absence of the equalizer is not related to this invention, cases in which equalization processing is not performed may be used.

The selection signal train produced by the logical processing performed by logical processing part 17 controls selection part 13; part of the sample train from equalizer 12 is selected and sent to feed-back processing part 14. Feed-back processing part 14 processes the selected samples for feed-back purposes and controls clock generating part 15. Clock generating part 15 ordinarily has a voltage-controlled oscillator as its constituent element. The difference from the prior art is that the signals controlling selection part 13 are made from the signals stored in test signal recording part 16.

Furthermore, logical processing part 17 generates, beforehand or concurrently, a selection signal train that selects the samples that have phase information from the test signal train of test signal recording part 16. This selection signal train should be stored in test signal recording part 16 when the logical processing is done beforehand. When this memory device begins the read-out from the memory medium, selection part 13 is controlled by means of logical processing part 17. The timing of the actions of equalizer 12, selection part 13, test signal recording part 16, and logical processing part 17 is controlled by the signals of clock generating part 15, but this is not shown in the figure.

Figure 3:
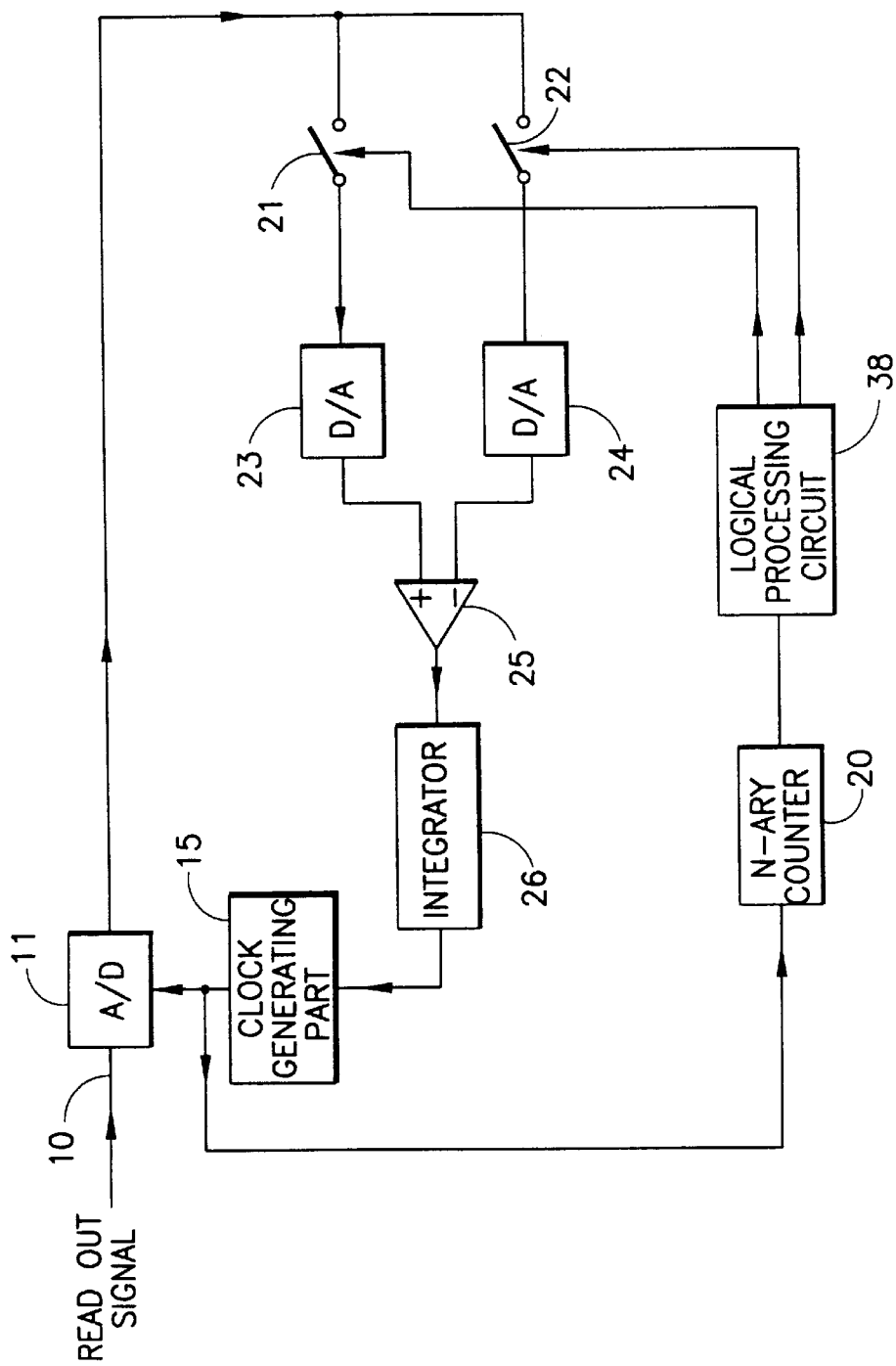
FIG. 3: Drawing showing a third embodiment of this invention.

FIG. 3 shows the third embodiment of this invention. The third embodiment is an example of the case in which the test signals are repeated signals. Like the first embodiment shown in FIG. 1, the samples with phase information are selected from the sample train sampled by A/D converter 11 by the switches 21 and 22. In FIG. 3, the constituent elements are shown in more detail than in FIG. 1; switches 21 and 22 correspond to selection part 13 of FIG. 1. The parts corresponding to feed-back treatment part 14 of FIG. 1 are the D/A converting parts 23 and 24, the differential amplifier 25, and the integrator 26 in FIG. 3.

The samples selected by switches 21 or 22 are converted to analog signals by D/A converters 23 or 24. The outputs of the two D/A converters are applied to differential amplifier 25, and a signal proportional to the difference is applied to integrator 26. The output of integrator 26 controls clock generating part 15.

In the case in which the test signal train is a train of known repeated signals, test signal recording part 16 of the kind shown in FIG. 1 may be absent. In the case in which the signals repeat every N clock times, the clock signals are counted by a divide-by-N (i.e., N-ary) counter 20, the counting signals are logically processed by a logical processing circuit 38, and they control switches 21 and 22.

The following is an example of the method of selecting the samples with phase information from the sample train. As the test signals that are written onto the memory medium of the memory device, a repeated signal of the typical PR4 preamble signal (in NRZI format, 001100110011) is chosen. FIG. 4 shows typical test signals, read-out signals, and sampling points.

When the written signal changes from 0 to 1, the readout signal becomes upwardly convex, and when the written signal changes from 1 to 0, the read-out signal becomes downwardly convex. C1 to C9 in FIG. 4 represent synchronized sampling points. In the case of FIG. 4, C2–C1, C3–C4, C6–C5, C7–C8 become the phase information. Using the fact that the written signals are as described above, the selection of phase information is performed by the selection signal train shown as D+ and D– in FIG. 5.

That is, C2 and C3 is selected when D+ becomes 1, and C1 and C4 is selected when D– becomes 1. The samples with positive phase information selected by the D+ timing are converted to analog signals by D/A converter 23, and the samples with negative phase information selected by the D-timing are converted to analog signals by D/A converter 24. Differential amplifier 25 amplifies the difference of D/A converters 23 and 24, and a signal corresponding to –C1+C2+C3–C4 is fed back to clock generating part 15. The same is true for C5 and after. In this way, the negative feed-back of the phase feed-back circuit works, and the desired synchronous sampling can be realized.

D+ and D– can be generated easily by the method of logically processing the count output of an N-ary counter 20 by logical processing circuit 38.

Figures 7, 9, 10:
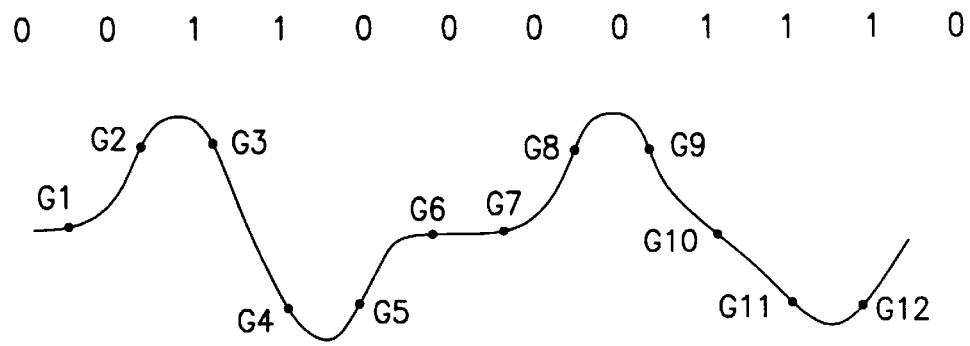
FIG. 7 Drawing showing a selection signal train that selects samples of an EPR4 signal.
FIG. 9: Drawing showing an example of a read-out signal of the fourth embodiment of this invention.
FIG. 10: Drawing showing a selection signal train that selects the samples of the read-out signal of FIG. 9.

The case of EPR4 will be explained as another example of a repeated test signal. FIGS. 6 and 7 are the same kinds of drawings as FIGS. 4 and 5. In the case of EPR4, E3 and E4 contain positive phase information, and E1 and E6 contain negative phase information. Therefore, the F+ and F– of FIG. 7 correspond to the positive and negative phase information, respectively. The same is true for F7 and after. Although not explained in the figure, synchronization can also be performed for the repeated signals corresponding to EEPR4, etc.

Figure 8:
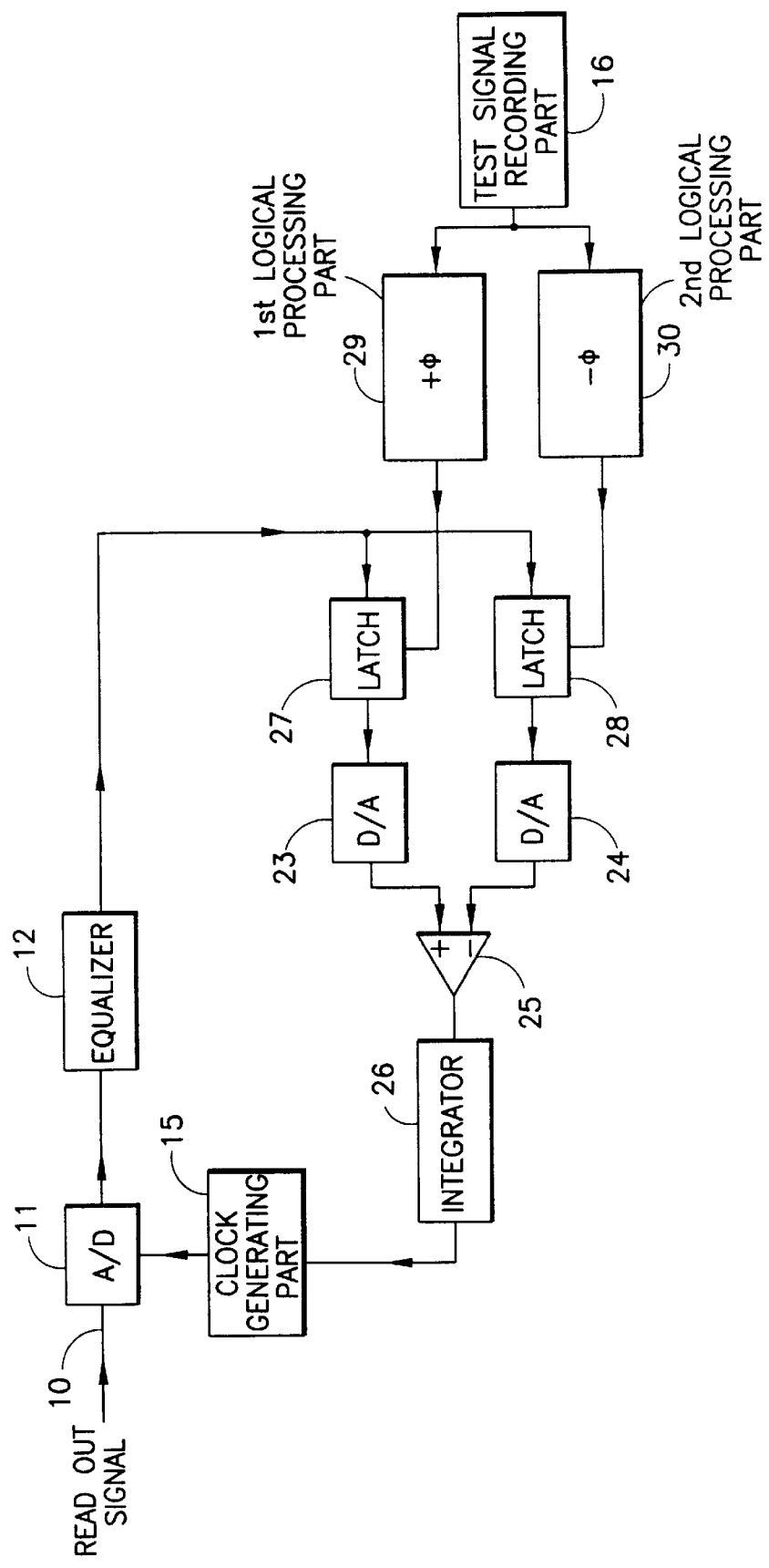
FIG. 8: Drawing showing a fourth embodiment of this invention.

FIG. 8 shows the fourth embodiment of this invention. The fourth embodiment is one that can be applied to any test signals one wishes. In the same manner as in the first embodiment, read-out signal 10 from the memory medium is sampled by A/D converter 11 and equalized by equalizer 12, if necessary.

FIG. 9 shows the written signal in the NRZI format, its read-out signal, and the samples (G1 to G12). The test signals stored in test signal recording part 16 are logically processed by first logical processing part 29 and a selection signal train that discriminates the samples with positive phase information is generated. Similarly, second logical processing part 30 produces a selection signal train that discriminates the samples with negative phase information. H+ in FIG. 10 is an example of a selection signal train that discriminates positive phase information, and H– is an example of a selection signal train that discriminates negative phase information. These selection signal train H+ and H– control latches 27 and 28 and select the samples with phase information.

In this example, the samples with positive phase information are the samples with a timing of 1 when the written signal changes from 0 to 1 and the samples with a timing of 1 when it changes from 1 to 0. The first logical processing part 29 can easily generate the H+ selection signal train by processing the test signal train. The H-selection signal train becomes 1 at the timing of 0 when the written signal changes from 0 to 1 and the timing of 0 when it changes from 1 to 0. Therefore, H– can be generated by the same method as H+.

Due to the selection signal train H+ and H–, only the samples with positive or negative phase information are selected and latched by latches 27 and 28. The output signals of latches 27 and 28 are converted to analog signals by D/A converters 23 and 24, respectively, and the difference is taken by differential amplifier 25. The output of differential amplifier 25 is fed back to clock generating part 15 by means of integrator 26.

In the case of the selection signal train shown in FIG. 10, the samples with positive phase information selected at G3 control the feed-back circuit until the next positive phase information G4. In contrast, the samples with negative phase information selected at G2 control the feed-back circuit up to G5. In this example, the weights of the individual samples are not uniform.

Figure 13:
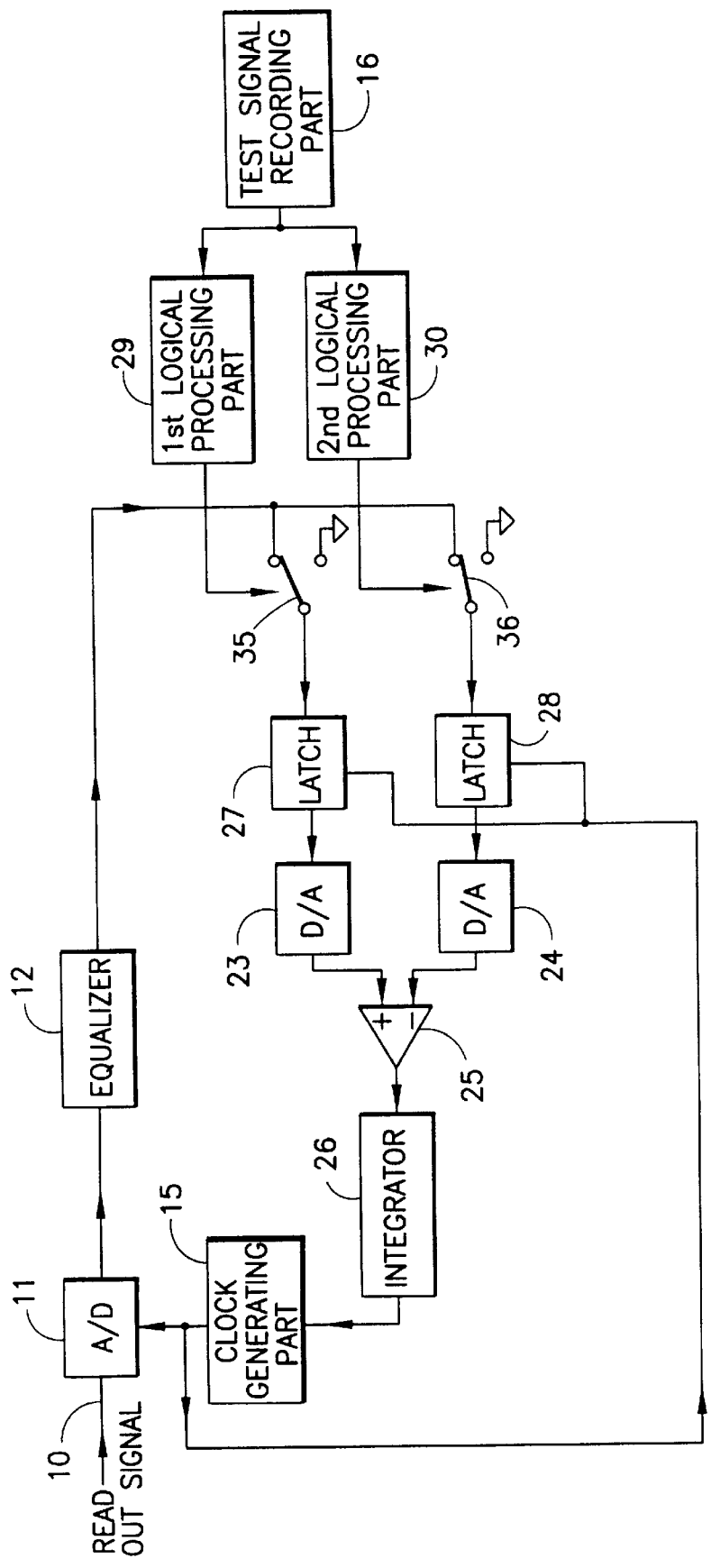
FIG. 13: Drawing showing a fifth embodiment of this invention.

FIG. 13 shows an example in which the weights are equal, as a fifth embodiment of this invention. In the fifth embodiment, switches 35 and 36 only pass samples with phase information during 1 clock cycle period, and the weights are made uniform. In the cases of PR4 and PR (1,1), discussed in the prior art, if first signal processing part 29 and second signal processing part 30 generate the selection signal train as described below, (see FIGS. 11, 12), they can be applied to the fourth embodiment.

Figure 20:
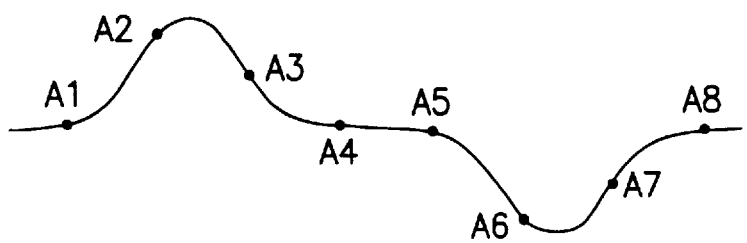
FIG. 20: Drawing showing an example of read-out signals corresponding to the PR4 mode.
Figure 21:
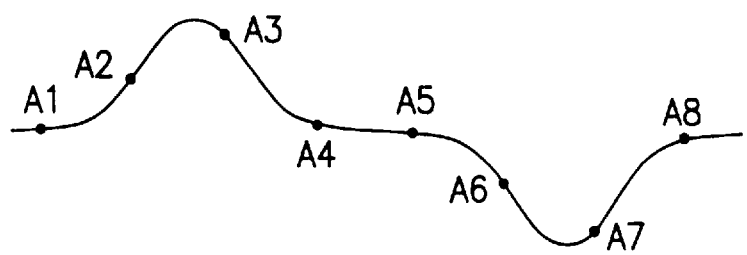
FIG. 21: Drawing showing an example of read-out signals corresponding to the PR4 mode.
Figure 22:
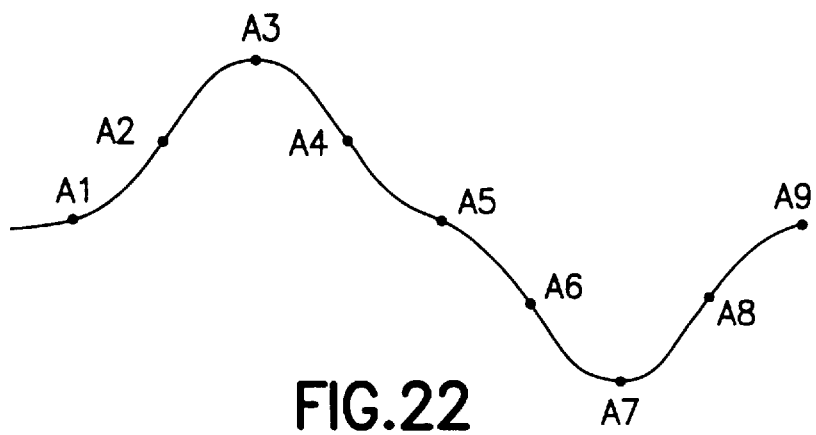
FIG. 22: Drawing showing an example of read-out signals corresponding to the EPR4 mode.
Figure 23:
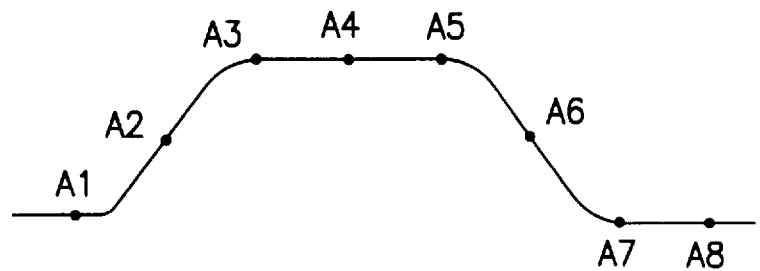
FIG. 23: Drawing showing an example of read-out signals corresponding to the PR (1,1) mode.
Figure 24:
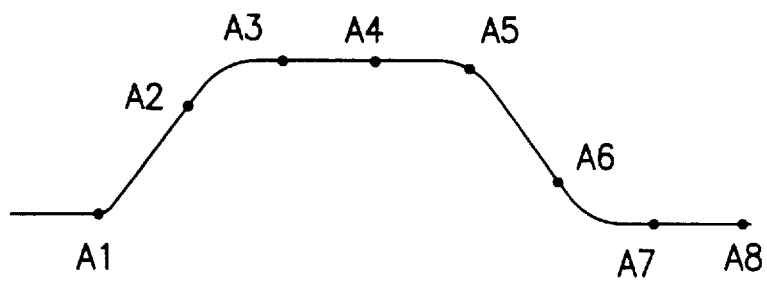
FIG. 24: Drawing showing an example of read-out signals corresponding to the PR (1,1) mode.
Figure 25:
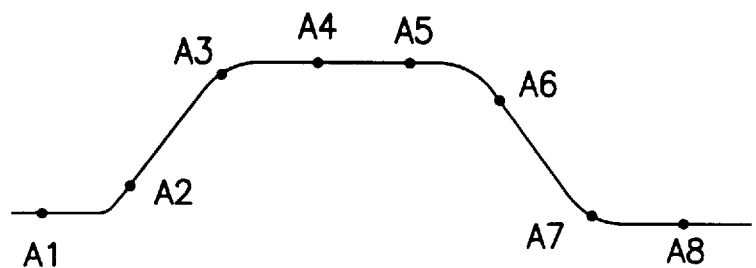
FIG. 25: Drawing showing an example of read-out signals corresponding to the PR (1,1) mode.

FIG. 11 shows a selection signal train that selects samples with phase information in the case of PR4, which was shown in the examples of FIGS. 19 through 21. In this case, since the samples with positive phase information are A3 and A6, the selection signal train becomes as shown by B+. Similarly, the negative selection signal train becomes B−. In the case of PR (1,1), shown in the examples of FIGS. 23 to 25, B+ and B−, shown in FIG. 12, are the selection signal train.

FIG. 15 is an example of read-out signals in the case in which the signals for phase synchronization signal, mark, and pseudo-random signals of the phase feed-back circuit have been written onto the memory medium.

Figure 14:
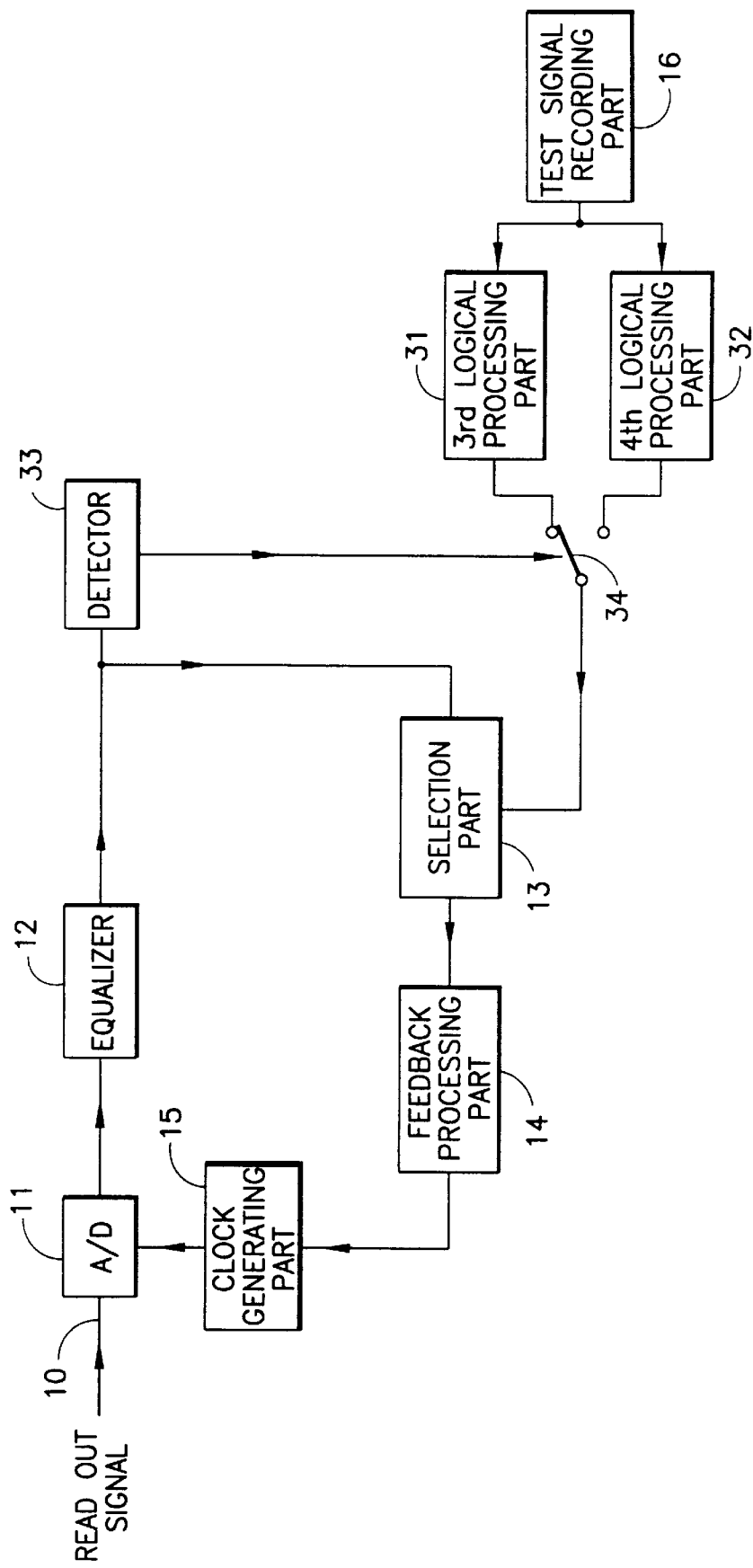
FIG. 14: Drawing showing a sixth embodiment of this invention.

As the sixth embodiment of this invention, FIG. 14 shows an embodiment of this kind of test signal. Switch 34 is connected in such a way that the signal of third logical processing part 31 is applied to selection part 13 until detector 33 detects the mark. The phase synchronization signal is a repeated signal with a short period; samples with phase information are selected by third logical processing part 31. As a result, the phase of the clock signal is synchronized with the read-out signal. After this, when detector 33 detects the mark, switch 34 is switched so that the signal of fourth logical processing part 32 is applied to selection part 13.

In the same manner as in the first embodiment, fourth logical processing part 32 produces, beforehand, a selection signal train that selects the samples with phase information from the test signal train of the test signal recording part. When switch 34 is switched to the side of fourth logical processing part 32, fourth logical processing part 32 controls selection part 13 by this selection signal train.

Since, in repeated signals such as the synchronization signals, it is not necessary to know the first point of the signal, synchronization can be performed by a method such as that of the third embodiment, but for signals that do not repeat, such as pseudo-random signals, the operation does not proceed properly unless the start timing is given correctly. Therefore, it is necessary to communicate the starting point of the signal to fourth logical processing part 32 by means of detecting the mark by detector 33.

Figure 16:
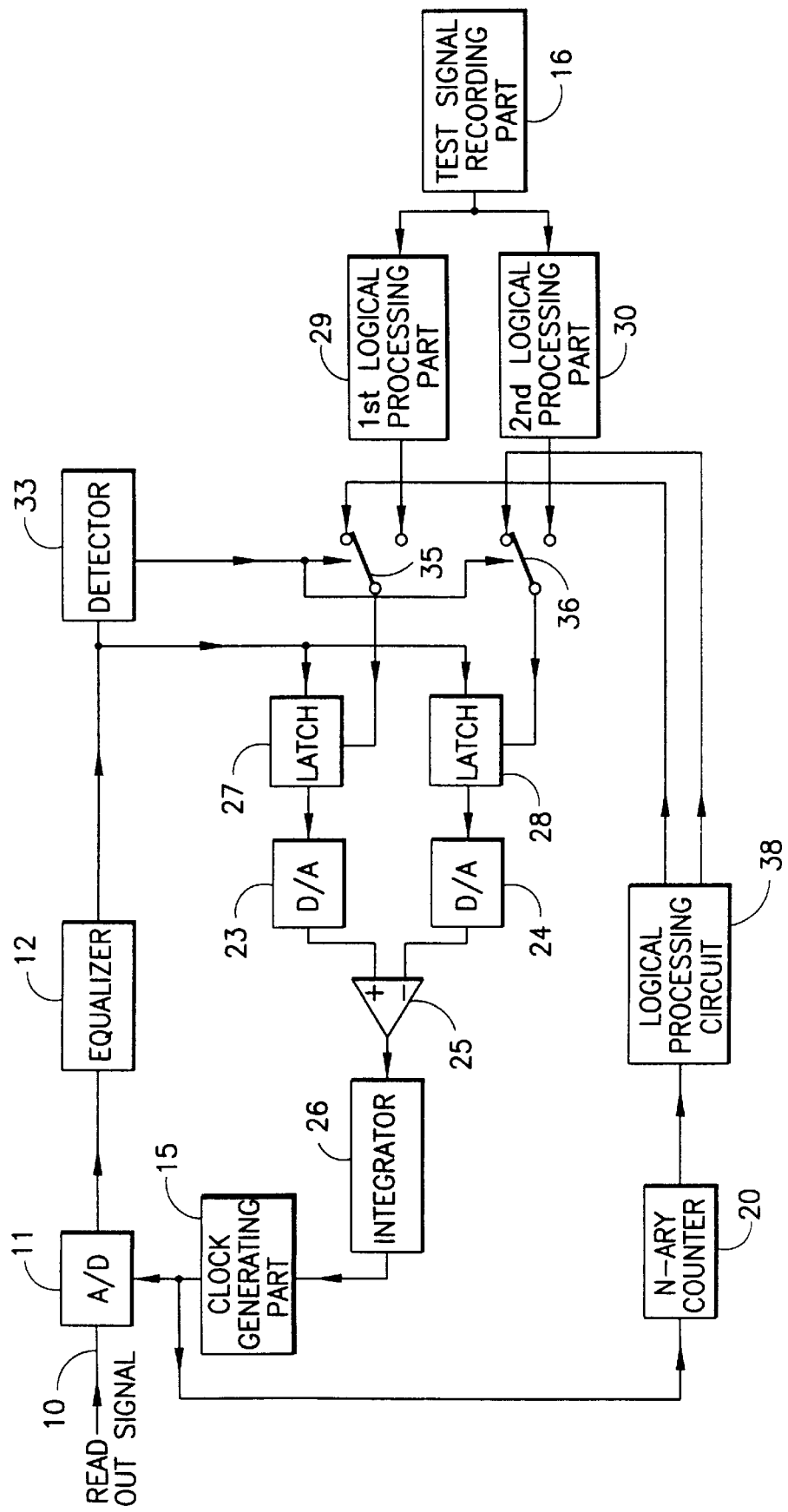
FIG. 16: Drawing showing the seventh embodiment of this invention.

FIG. 16 shows the seventh embodiment of this invention. The seventh embodiment, like the sixth example, is also an embodiment for any type of signal, such as a pseudo-random test signal. Moreover, the constituent elements in this example are shown more concretely than the sixth embodiment of FIG. 14. In the sixth embodiment, the selection signal, with respect to the phase synchronization signal of the phase feed-back circuit, is obtained from test signal recording part 16 and the third logical processing part. In contrast, in the seventh embodiment, as in the third embodiment, the clock signal is counted by N-ary counter 20 and the count signal is logically processed by logical processing circuit 38; by this method, the selection with respect to the synchronization signal is controlled. The arrangement after latches 28 and 29 is the same as in the fourth embodiment.

Until detector 33 detects the mark, switches 35 and 36 are connected so that the selection signal train from logical processing circuit 38 controls the latches 27 and 28, and a phase-locked loop is formed. When the detector 33 detects a mark, switches 35 and 36 are switched so that the signals from first logical processing part 29 and second logical processing part 30 are applied to latches 27 and 28, and synchronous operation with respect to the pseudo-random signals begins. The generation of the selection signal train and the phase control with respect to the pseudo-random signals are the same as the method shown in the fifth embodiment.

Figure 17:
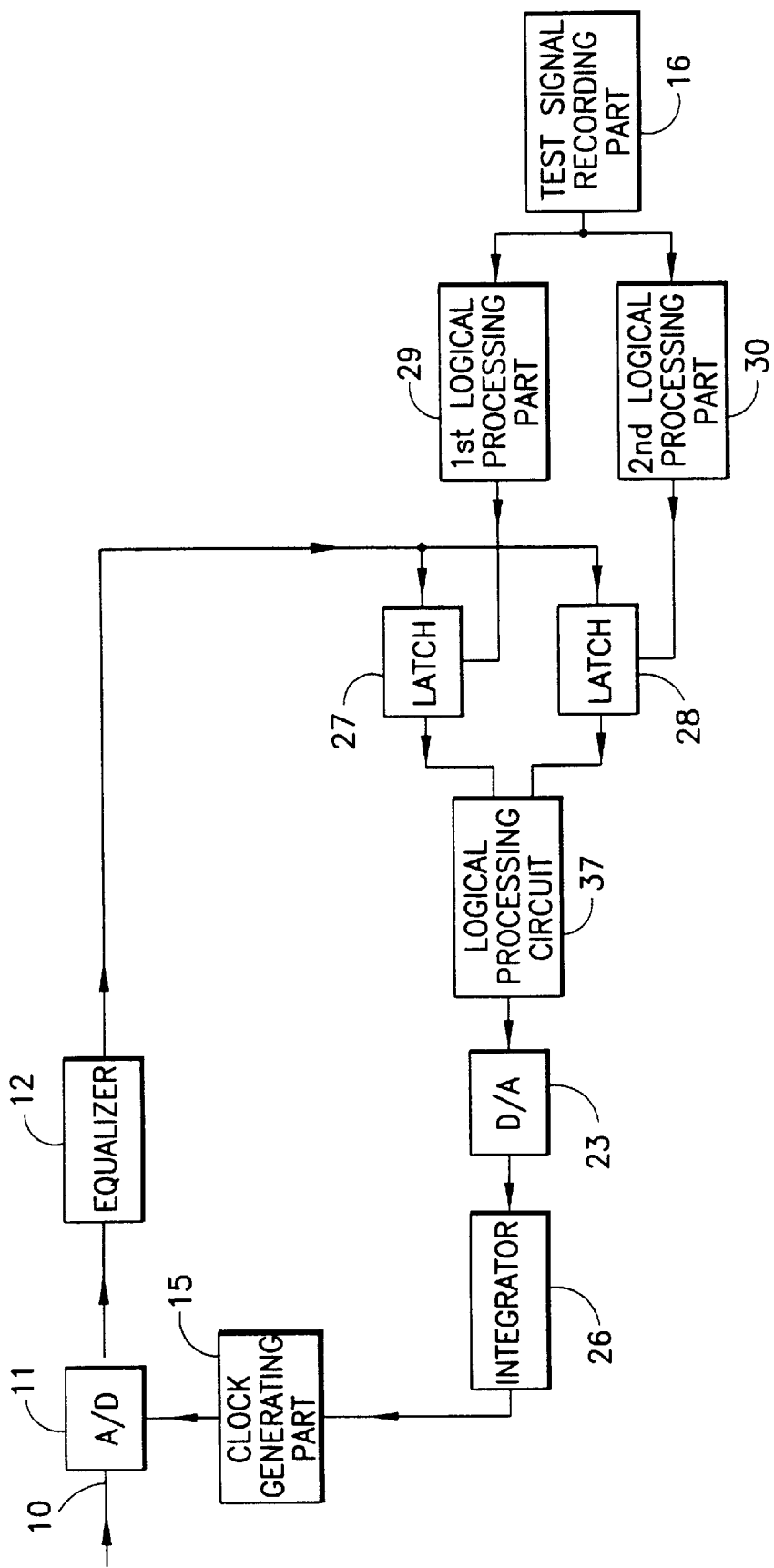
FIG. 17: Drawing showing an eighth embodiment of this invention.

In the third, fourth, fifth, and seventh embodiments, examples are shown in which two D/A converters, positive and negative paths, are provided. FIG. 17 shows an example, as the eighth embodiment, in which there is one common D/A converter 23. The eighth embodiment will be explained in comparison with the fourth embodiment.

In the fourth embodiment, the difference in the outputs of the two D/A converters is obtained by differential amplifier 25 of the analog signals. In the eighth embodiment, the difference in the outputs of latches 27 and 28 is obtained by logical subtractor 37 at the stage before D/A converter 23.

In this invention, as explained above, samples with phase information are selected by using a selection signal train produced from signals that correspond one-to-one with test signals written onto a memory device. Therefore, accurate phase information can be obtained even with signals that include large quantities of noise. Therefore, correct synchronous sampling can be performed, and correct measurements can be obtained, so that this invention has practical advantages. Moreover, re-synchronized sampling, which is necessary in cases in which oscilloscopes are used, is not used in this invention; therefore, it also has the effect of increasing the measurement speed.

Embodiments of this invention have been shown above, but it is not limited to the methods, arrangements, and other aspects of the examples; modifications of the arrangement are permitted, if desired, as long as the concept of the invention is not lost.

I claim:

1. A synchronous sampling apparatus, comprising:
   conversion means for sampling signals read out from a memory medium;
   a sampling signal generator for controlling said conversion means;
   memory means for storing signals written into the memory medium;
   means for logically processing the signals recorded on the memory means;
   selection means for selecting samples with phase information from a sample train obtained by a sampling action of said conversion means; and
   wherein the selection means is controlled by output signals from said means for logically processing; and
   wherein the samples with phase information are fed back from said selection means to control the sampling signal generator, and sampling is thereby achieved that is synchronized with the signals read out from the memory medium.

2. An apparatus which measures desired characteristics of a memory device by using a sample train, comprising:
   means for sampling signals read out from the memory device to produce said sample train;
   a sampling signal generator for controlling said means for sampling;
   selection means coupled to said means for sampling for selectively outputting desired samples from the sample train; and wherein samples selected by the selection means are fed back to the sampling signal generator and control a frequency of the sampling signal so as to cause said means for sampling to perform sampling that is synchronized to signals read out from the memory device; and further comprising:

a test signal recording means that records a test signal train written into the memory device;

logical processing means for logically processing the test signal train read from the test signal recording means and for applying said test signal train that has been logically processed, to said selection means; and wherein the selection means selectively outputs sample signals in accord with phase information from the test signal train that has been logically processed; and wherein the sampling signal generator is controlled by application of the sample signals from said selection means, to synchronize signals sampled from said memory device to signals read out from the test signal recording means.

3. An apparatus for measuring characteristics of a memory device by use of a sample train, comprising:

means for sampling signals read out from the memory device to produce said sample train;

a sampling signal generator coupled to said means for sampling;

selection means for selectively outputting desired samples with phase information from the sample train; and wherein samples selected by the selection means are fed back to the sampling signal generator to control a frequency of a sampling signal generated thereby, so as to perform sampling that is synchronized to signals read out from the memory device;

and further comprising:

frequency-dividing counting means for dividing and counting the frequency of the sampling signal;

logical processing means for logically processing a count output from the frequency-dividing counting means; and wherein the selection means selectively outputs the samples with phase information from the sample train under control of said logical processing means; and wherein the sampling signal generator is controlled by using the samples with phase information and sampling is performed that is synchronized to signals read out from the memory device.

4. An apparatus for measuring a memory device in accordance with claim 2, wherein the phase information is obtained by using the fact that the signals read out from the memory device have a partial response.

5. An apparatus for measuring a memory device in accordance with claim 3, wherein the phase information is obtained by using the fact that the signals read out from the memory device have a partial response.

6. An apparatus for measuring a memory device in accordance with claim 2, wherein, before the memory device is read, the logical processing means logically processes the test signal train that is recorded in the test signal recording means and produces a selection signal train, and while the memory device is read, the logical processing means selects the samples with phase information from the sample train by using the selection signal train.

7. An apparatus for measuring a memory device in accordance with claim 6, wherein the logical processing means processes and separates the test signal train recorded on the test signal recording means into a first selection signal train, which discriminates samples with positive phase information, and a second selection signal train, which discriminates samples with negative phase information, and employs a selection signal train to control the selection means.

8. An apparatus for measuring a memory device in accordance with claim 2, 3, 6, or 7, wherein the test signal train that is written into the memory device includes a signal for phase synchronization of the sampling signal generator, a test signal train that measures properties of the memory device, and a mark signal between the signal for phase synchronization and the test signal train; and the apparatus for measuring a memory device includes a detection means for discriminating the mark signals, and the logical processing means; and until the detection means detects that the memory device has read out the mark signal, the selection means selects samples with phase information from the sample train of the signals for phase synchronization and controls the sampling signal generator therewith; and after the detection means detects that the memory device has read out the mark signals, an operation is activated to select samples with phase information from the sample train of the test signal train, under the control of the selection signal train.

9. An apparatus for measuring a memory device in accordance with claim 8, wherein the signal for phase synchronization is a repeated signal with a constant pattern, and the mark signal has a different pattern from the signal for phase synchronization.

* * * * *